United States Patent [19]

Kousaku et al.

[11] Patent Number: 5,117,544
[45] Date of Patent: Jun. 2, 1992

[54] TWO-SPINDLE OPPOSED TYPE CNC LATHE

[75] Inventors: Suzuki Kousaku; Okuno Naoki, both of Ishikawa, all of Japan

[73] Assignee: Nakamura-Tome Precision Ind. Co., Ltd., Ichikawa, Japan

[21] Appl. No.: 449,912

[22] PCT Filed: Apr. 19, 1989

[86] PCT No.: PCT/JP89/00422

§ 371 Date: Dec. 12, 1989

§ 102(e) Date: Dec. 12, 1989

[87] PCT Pub. No.: WO39/10223

PCT Pub. Date: Nov. 2, 1989

[30] Foreign Application Priority Data

Apr. 19, 1988 [JP] Japan ................................ 63-96356

[51] Int. Cl.⁵ .................................................. B23B 3/00
[52] U.S. Cl. ............................................ 29/27 C; 29/36; 29/DIG. 56; 82/118; 82/120; 82/129
[58] Field of Search ............... 29/27 C, 36, DIG. 56; 82/129, 146, 901, 118, 119, 120

[56] References Cited

U.S. PATENT DOCUMENTS

| | | | |
|---|---|---|---|
| 2,473,306 | 6/1949 | Schreiber | 82/129 |
| 2,656,754 | 10/1953 | Treer | 82/146 |
| 4,359,676 | 11/1982 | Fujioka | 82/146 X |
| 4,612,832 | 9/1986 | Ushigoe et al. | 82/129 |
| 4,621,405 | 11/1986 | Cook et al. | 29/27 C X |

FOREIGN PATENT DOCUMENTS

| | | |
|---|---|---|
| 0289333 | 11/1988 | European Pat. Off. . |
| 3420719 | 6/1984 | Fed. Rep. of Germany . |
| 3537927 | 10/1985 | Fed. Rep. of Germany . |
| 3717204 | 10/1987 | Fed. Rep. of Germany . |
| 58-186501 | 10/1983 | Japan . |
| 59-129601 | 7/1984 | Japan . |
| 60-232802 | 11/1985 | Japan . |
| 60-57961 | 12/1985 | Japan . |
| 62-130101 | 6/1987 | Japan . |
| 2178991 | 2/1987 | United Kingdom . |
| 2181372 | 4/1987 | United Kingdom . |

Primary Examiner—Z. R. Bilinsky
Attorney, Agent, or Firm—Bauer & Schaffer

[57] ABSTRACT

A CNC lathe comprising two opposed spindle stocks (2a, 2b) and two turret type tool rests (3a, 3b), in which a base (1) is of a slant type, the first spindle stock (2a) is secured to the base (1), the second spindle stock (2b) is provided to be capable of being moved and located only in a direction to the spindle, and both the tool rests (3a, 3b) are arranged in the deep side of the spindle stocks (2a, 2b). The CNC lathe having said construction in which both spindle stocks include an independent spindle motor (21), a spindle indexing and driving device (23) capable of mechanically releasing connection, and encoders (27, 26) on the side of the spindle, and the indexing and driving device wherein an index motor (40) is rotated on the basis of a phase difference detected by the encoder to match a phase when the spindle indexing and driving device (23) is connected to the spindle (11), so when a work (16) is delivered between both the spindles (2a, 2b). The CNC lathe having said construction comprising a synchronous control device (53) for cutting the output pulses of the encoders 27 mounted on both the spindles through a fine time unit to correct a speed command according to large and small relation therebetween. This invention provides a CNC lathe in the rigidity of the first spindle stock is high, a bar feeder having a conventional construction can be used, and efficiency for working the work including indexing working by both the spindles and efficiency for working a bar material which requires cutting-off when the work is delivered between both the spindles are enhanced much.

11 Claims, 9 Drawing Sheets

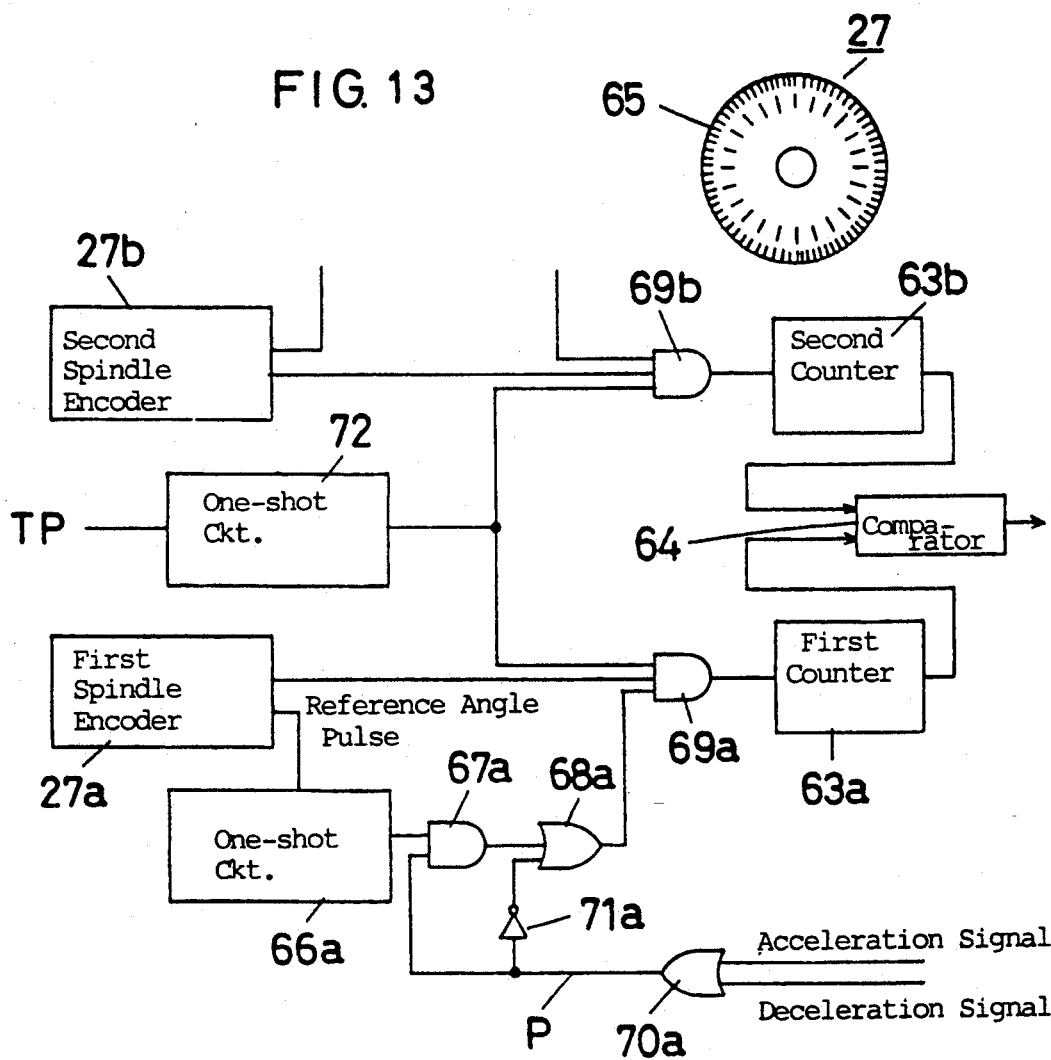
FIG. 14
FIG. 13
FIG. 15
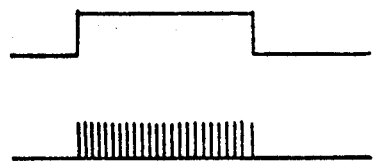
(a)
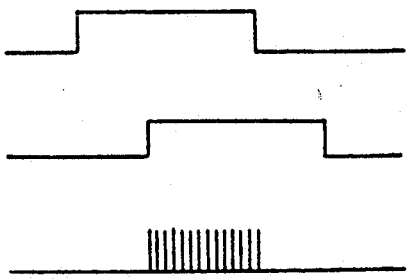
(b)

TWO-SPINDLE OPPOSED TYPE CNC LATHE

DESCRIPTION

1. Technical Field

This invention relates to a machine tool for working a work in the shape of a rotary body, and relates to a CNC (computer numerical control) lathe provided with two spindle stocks and two tool rests opposed on a single base.

2. Background Art

It has been heretofore carried out to add milling working to a conventional one-spindle type CNC lathe. In this case, a main spindle stock is secured to a base. In association with the spindle there is provided a spindle motor for machining and working and a spindle index driving device capable of being mechanically engaged with and/or disengaged from the spindle motor and a spindle orientation mechanism using a locating roller, a locating pin and the like so that the spindle can be stopped at an angle of an original point. The spindle index driving device and the spindle (the first spindle) are coupled at the angle of the original point. The tool rest is of the turret type, which can be moved and located in a direction of the spindle (in a direction of axis Z) and in a direction at a right angle to the spindle (in a direction of axis X), and the turret with a machining tool, a milling tool and a drilling tool arranged in the periphery thereof is indexed to work. The milling tool and the drilling tool are driven by a milling motor for rotating the tool.

On the other hand, the demand for a composite machine has been increased in view of the desire of obtaining a complete product by a single machine, in which the machining and milling working are done by use of the first spindle, after which the back working is carried out by the same machine. To this end, a machine using a subspindle obtained by improving a conventional tail stock has been proposed. In the machine of this kind, a subspindle unit is provided at a position of a conventional tail stock. This subspindle can be moved and located in a direction of axis Z by a hydraulic cylinder or an NC servo. The subspindle is moved forward to grip the end of a work piece, and the work piece is delivered from the spindle (the first spindle) to the subspindle to effect the back working. When the back working is carried out, the work piece held on the chuck of the subspindle is rotated and driven by the subspindle motor and worked by the tool mounted on the turret on the tool rest. In the case where the work material is a bar, the end of the bar is gripped by the subspindle before the work piece is cut off from the bar, and the first spindle and the subspindle are rotated at substantially the same speed to effect cutting-off and the work piece is delivered from the first spindle to the subspindle.

Principally, the machine body is arranged so that a flat shape base is used to reduce cost, and a chip receiving box is provided in the center of the base to provide a compactness. However, since the subspindle is one improved over the tail stock, the scale thereof is so small hat the back working merely includes chamferring and back finishing. Above all, the first spindle is in the stopped state during the back working, and the efficiency was poor.

In view of the foregoing, formation of a machine cell has been developed so that a subspindle is replaced by a powerful second spindle, a turret tool rest corresponding to the second spindle is provided to enable powerful composite working including indexing of the first spindle and second spindle, and the continuous operation can be accomplished while simultaneously performing working of both front and back surfaces of the work as well as the automatic delivery of the work between both the spindles.

In the two-spindle opposed type lathe of this kind, it is designed on the premise that the work is directly delivered from the first spindle to the second spindle and that all workings including milling and boring are accomplished by a single machine to obtain a finished product, and therefore, the synchronous operation of the first spindle and the second spindle is inevitably required. For example, when the spindle indexing is included in both front working and back working, after the initial machining has been completed, the first spindle is mechanically located at an angle of an original point by the orientation (locating stop) operation, at which position, the spindle index driving device is connected to the first spindle, from which position the spindle is indexed to effect milling or boring at the first spindle. In the delivery of the work piece, the first spindle is returned to the angle of the original point, and the delivery of the work piece is carried out by the operation such that the tip end of the work piece is gripped by the second spindle located to the angle of the original point by the similar orientation operation. In the case of the bar, after the tip end of the bar has been gripped by the second spindle, the second spindle is relatively slowly accelerated while following the first spindle, and its rotation speed is increased to the predetermined rotational speed to effect cutting-off.

In the two-spindle opposed lathe, various types in which arrangements of the spindles and tool rests on the base are different have been proposed. For example, in the construction proposed in Japanese Patent Application Laid-Open Publication No. 57-0480402, the first spindle is secured to the base, and the second spindle is moved and located only in the direction of axis Z while both the first and second tool rests can be moved and located in both directions of axes Z and X, the second tool rest being arranged before the base from the spindle position. In the construction proposed in Japanese Patent Publication No. 60-57961, the first spindle and the seocnd spindle are opposed and both can be moved and located in the direction of axis Z, and the first tool rest and the second tool rest can be moved and located in the direction of axis X, both the tool rests being arranged in the deep side of the base from the spindles. Further, in the construction proposed in Japanese Patent Application Laid-Open Pulication No. 58-186501, the first spindle and the socond spindle are opposed and both can be moved and located in the direction of axis Z, the first tool rest and the second tool rest can be moved and located in both directions of axes Z and X.

In the prior art, the orientation operation of the spindle has been carried out in a method in which when the spindle is rotated and then arrives at a position of an angle of an original point, a pin, a roller or the like is fitted into a groove-like portion provided on the spindle. The fact that the pin or the roller is fitted is detected to stop the rotation of the spindle, and the fitted pin or roller stops the free rotation of the spindle to maintain the angle of an original point. The spindle index driving device itself rotates to be located at an angle of an original point. This position of the angle of an original point is the meshing point of a connection gear of the spindle index driving deivce. When both elements were determined in angle, a shift gear is shifted to connect the spindle index driving device to the spindle. The time interval required till the original angle is searched out after the spindle has been lowered in speed is called orientation time, and this time interval is lasted to a few seconds in a certain case which is idle time, causing the working efficiency to be lowered.

In working a flange, a large chuck has to be used, and therefore, power of the prior sub-spindle is shorten, and hence limiting the size of the work piece that may be worked. In re-gripping the work which is relatively small in longitudinal dimension, it is necessary to adjust phases of both the spindles in the state wherein the phase of the second spindle is off set (for example, 30 degrees) so that both the chuck jaws are not interferred. Such an operation takes time in the conventional construction.

In working a bar, both sides of the work are simultaneously gripped by two spindles, in which state, rotaion thereof is increased to effect machining. At that time, when a phase difference or a speed difference between the first and second spindles occurs, torsional stress exerts on the work, giving rise to problems that the work is twisted and cut, the shuck jaw becomes slipped to give a scrach to the face of work piece, the work piece becomes deviated in phase, and the like. It is therefore necessary to provide a control device for rotating the first and second spindles in synchronism.

The conventional control device of this kind has a construction in which the NC device issues a speed command to a motor control unit for controlling spindle motors, the phase or speed of the spindle is measured by the encoder mounted on the spindle, and the signal thereof is fed back to the motor control unit or the NC device. This control system is provided on each of the first spindle and the second spindle to control the synchronous operation between both the spindles, that is, acceleration, deceleration, even speed operation and so on in the state wherein the common work piece is held. However, in the independent control at every spindle as described above, the accurate synchronous driving cannot be performed due to the difference in inertia between the respective spindles, the difference in acceleration and deceleration characteristics of the spindle motors or the like, thus sometimes giving rise to the aforementioned problems such as the torsion of the work piece, slipping of the holding jaw and the like.

In view of the foregoing, in a certain kind of device, a control device has been proposed in which the master and servant relationship is established between the motor control section and the main spindle motor so that the sub-spindle follows the main spindle. According to this device, a torsional force within a tolerable range is left in the work piece held between both the spindles so as to effect acceleration, deceleration and even driving without modification.

However, the needs of shortening acceleration and deceleration time as short as possible in order to increase the operating efficiency of the machine has been increased, and the spindle motor having a large torque has been employed to achieve that needs. In this case, it becomes difficult for the conventional following control device to cover the difference in inertia and the difference in acceleration and deceleration characteristics between both the spindles. Therefore, such a phenomenon occurs again that in small diameter works, a torsional rupture occurs in blank, and in large diameter works, a portion in contact with the chuck slips to scratch the faced work piece. The reason is that since the control device for each spindle effects a closed loop control, the drive rigidity with respect to the command speed value is high, the output of the motor is increased so that the greater part of the output of the spindle motor is energy for rapidly accelerating the spindle against the inertia of the spindle, and thus the difference in inertia between the spindles at the time of rapid acceleration and deceleration and the difference in speed characteristics of the motors which varies every speed halfway cannot be absorbed by the torsional force within the allowable range to the extent that the work piece is not adversely affected.

In the construction in which the tool rest is provided on this side before the spindle as the structure of the whole machine, there involves problems that the accessibility of an operator or a robot arm to the spindle is poor, loading and unloading the work piece to the spindle are inconvenient, and mounting and removing work piece of the work beyond the tool rest involves a danger. On the other hand, the construction disclosed in Japanese Patent Publication No. 60-57961 and Japanese Patent Application Laid-Open Publication No. 58-186501 comprises the rational structure in which a working shape is decided by the synthetic operation of the movement of the first and second spindle stocks in the direction of Z and the movement of the first and second tool rests in the direction of X, which has the merit which provides a simple construction symmetrical to left and right but which gives rise to a problem of the short in rigidity of the first spindle stock caused by the movement of the first spindle stock and a problem of workability when the bar is automatically fed and worked. That is, normally, the blank is initially mounted on the first spindle but at that time, the weight and the unbalance amount of the work piece are largest throughout the whole working process and the initial process often involves the heavy cutting. Therefore, particularly large rigidity is required for the first spindle stock. However, in the construction in which the first spindle stock is moved, the short of rigidity of the first spindle stock tends to occur. Further, in the case where a method is employed in which a bar is automatically fed through a hollow aperture of the first spindle, when the first spindle stock moves, an unworked blank extending through the first spindle also moves in an axial direction, thus posing a problem that most of bar feeders heretofore used cannot be used.

Furthermore, two tool rests are arranged close to each other in terms of the needs of miniaturizing the machine. However, in the construction in which both the tool rests can be moved only in the direction of X, the moving ability in the direction in which the tool rests are moved apart from each other is not provided, and therefore, there is a disadvantage in that the operability becomes bad when the tool is mounted or removed from each turret and the tool rest is checked and repaired.

Moreover, mainly, the construction of the base is of the flat shape in which a chip receiving box is provided in the center of the base to provide compactness. This induces problems, in terms of spacious restriction, of a leakage of coolant due to the out-of-order of the filtration of the cutting liquid, the out-of-order in maintenance work after the chip conveyor has been installed, and the like.

In view of the aforesaid various problems with respect to the conventional construction, it is a task of this invention to provide a 2-spindle opposed type CNC lathe which is excellent in rigidity and workability, to provide a 2-spindle opposed type CNC lathe which can promptly adjust phases of two opposed spindles and which can efficiently perform various composite workings accordingly, and to provide a synchronous control device of a 2-spindle opposed type CNC lathe which can more positively perform synchronous control of the speed or phase between the spindles in which the difference in inertia or speed characteristic therebetween is large and which can follow even the rapid acceleration and deceleration operations.

DISCLOSURE OF THE INVENTION

In the 2-spindle opposed type CNC lathe of this invention, a base 1 is of a slant type. Two opposed spindle stocks 2a and 2b are provided on the base 1, and two tool rests 3a and 3b are arranged at the deep side thereof. The first spindle stock 2a and the first tool rest 3a form a first working unit 17a, and the second spindle stock 2b and the second tool rest 3b form a second working unit 17a. An expansible cover 18 inclined on this side is provided between the first spindle stock 2a and the second spindle stock 2b to cover the upper surface of the base 1 in the working area, a chip receiving box 4 is arranged in the form of a separate installation at the lower portion of the edge on this side of the base 1, and a chip conveyor 5 is mounted in a lateral direction to the chip receiving box.

The first spindle stock 2a is integrally secured to the base 1, and the first tool rest 3a is mounted on the base 1 through a ZX slide 7 which can be moved and located in both Z and X directions. The second spindle stock 2b is mounted on the base 1 through a Z slide 6 which can be moved and located only in a direction of axis Z in the state wherein axes of a first spindle 11a and a second spindle 11b are made in registration with each other, and the second tool rest 3b is mounted on the base 1 through an X slide 8 which can be moved and located only in a direction of axis X. The above-mentioned slides 6, 7 and 8 are moved and located by a mechanism similar to a slide of a tool rest in a conventional CNC lathe, and the feed speeds and positions of the slides and the speed and the rotational angle of the spindles are controlled by a program of a CNC device 46.

Each of the first and second spindles 11a and 11b is independently provided with a spindle motor 21 for machining, a spindle encoder 27 for detecting a phase of the spindle, a spindle indexing and driving device 23 for milling of indexing and contering, an indexing motor 40 and an indexing encoder 26. The spindle indexing and driving device 23 and the spindle 11 can be mechanically connected and disconnected.

There is provided a CNC device 46 for systematically controlling the whole machine. In adjusting the phases of the second spindle 11b and the first spindle 11a in accordance with a command of the CNC device in order to deliver the work between the spindles, there is provided a control device for rotating an indexing motor 40 in accordance with a difference in indicated value between a reference position phase of the indexing encoder 26 and the present phase to adjust the phase of the first spindle and the second spindle to the same phase or a set phase difference. This invention further provides, as a preferable construction, a control device for rotating the second spindle 11b and the first spindle 11a in the opposite direction to each other to a target phase in adjusting the mutual phases between the spindles.

Each of the spindles of the first and second spindle stocks 2a and 2b provided with the above-described construction is connected to the spindle indexing and driving device 23 through a shift gear 24. There is provided means for calculating the meshing positions between the paired shift gears 24 and 25 in the first and second spindles from two sets consisting of four data, i.e., the reference position phase and the present phase of the spindle detected by each spindle encoder 27 and the reference position phase and the present phase detected by the indexing encoder 26. In connecting the spindle 11 to the spindle indexing and driving device 23, there is employed a control device for rotating the spindle indexing and driving device 23 to the meshing position determined by the above-mentioned calculating means on the basis of the command from a CNC device to mesh with the shift gear 24.

In working a bar material, a synchronous control device 53 for synchronously rotating two spindle motors 21a and 21b is provided to effect machining or cutting-off while synchronously rotating both the spindles 11a and 11b by the synchronous control device. As this synchronous control device, such a synchronous control device is provided which is comprised of a slow speed discriminating circuit 54 for dividing signals issued from both the spindle encoders 27 by fine unit time to measure them and comparing the magnitude relationship therebetween, a correction value setter 55 for setting one unit of correction value, speed command correction circuits 58a and 58a for correcting speed commands provided for motor control portions 52a and 52b of the spindle motors, respectively, and a correction command circuit 56 for supplying said one unit of correction value to said speed command correction circuits as an addition or subtraction signal on the basis of the output from the slow speed discriminating circuit, whereby the correcting operation is repeated at fine time intervals in a lagging direction for phase-leading side while in a leading direction for the phase-lagging side.

The spindle encoder means an encoder for detecting rotation of the spindle during machining rotation. The slow speed discriminating circuit 54 is designed so that when the spindles 11a and 11b are in the acceleration and deceleration operations, it detects difference between the phases of the respective spindles and compares, while when the spindles 11a and 11b are rotated at constant speed, it detects and compares the rotational speed differences of the respective spindles. This is preferable in terms of avoiding hunting during constant speed rotation. Since two spindles need to be operated individually, a switch 57 is provided to cut off the synchronous control device from the control system.

A brake device 22 capable of adjusting a load for applying a rotational load to the spindle 11 can be provided on the spindle stock 2. The braking force of the brake device is controlled in connection with the rotation of the spindle.

Working of the work piece in the lathe according to this invention is carried in the following procedure. First, the work piece 16 is held by the first spindle 11a and machined in cooperation with the first tool rest 3a. The working shape of the work piece at that time is decided by the movement of the first tool rest 3a in the directions of Z and X. If milling and boring are included in the first working unit 17a, the phases between the first spindle 11a and the spindle indexing and driving device 23 at thier connection portion are matched after termination of the machining, and the spindle indexing and driving device 23 is connected to the spindle to effect milling working of indexing and contouring. Upon termination of working at the first working unit 17a, the phase of the second spindle 11b is coincided with the phase of the first spindle 11a and then the second spindle stock 2b is moved toward the first spindle stock 2a to directly re-grip the work piece 6 from the first spindle 11a to the second spindle 11b. In case of working the bar, the step of synchronously rotating the first spindle 11a and the second spindle 11b to cut off the work 16 from the end of the bar by the cutting-off working is included.

In the present invention, in connecting the spindle indexing and driving device 23 to the spindle 11, indexing is effected to the meshing position of the shift gear 24 on the basis of the count value of the spindle encoder 27 indicative of the stop angle of the spindle 11 to rotate the motor 40 to connect the spindle indexing and driving device 23 to the spindle 11, in place of the orientation operation for locating the spindle to the angle of original, to avoid a loss of work time during orientation of the spindle. In matching the phases of the first spindle 11a and the second spindle 11b when the work is delivered, the spindle indexing and driving device 23b is connected to the second spindle 11b in the above-described procedure, after which the count value of the indexing encoder 26a of the first spindle when the indexing is terminated is read to rotate the indexing motor 40 till that value coincides with the second spindle or till it assumes the designated difference of angle, and matching of the phases is effected to deliver the work piece. In working the bar, the end of the bar is held by the second spindle, and thereafter the rotation is increased to effect cutting-off working while synchronously rotating the first spindle and the second spindle by the synchronous control device 53.

If as the indexing motor 40, a servo motor normally used is used, the high speed locating on the side of the spindle indexing and driving device 23 can be easily accomplished, and the connection between the spindle 11 and the spindle indexing and driving device 23 can be accomplished in a few seconds. The matching of the phases of the first spindle 11a and the second spindle 11b during the delivery of the work can be likewise accomplished in a short period of time, and the delivery time of the work is shortest. Generally, the indexing on the side of the first spindle is carried out after the machining, and therefore, when the indexing on the side of the first spindle is terminated, the spindle indexing and driving device 23a is already connected to the first spindle 11a, and portions of phase deviation of both the spindles may be easily coincided by rotating both the spindle indexing and driving devices in the direction close to each other.

In the case where the work piece is a flange, the longitudinal dimension of the work is relatively small in many cases. In this case, therefore, when the second spindle is made to access in an attempt of re-gripping from the first spindle to the second spindle, both the chuck jaws become interferred to possibly collide with each other. To avoid this, it is necessary to bias the phase of the second spindle through 30 degrees (in case of three pawls) with respect to the reference position of the chuck of the first spindle. However, according to the present invention, the amount of rotation of the first spindle or the second spindle may be corrected through the biased angle amount when the work is delivered. The phase difference will suffice to be designated to the NC program.

Further, the increase of rotation in the state wherein both ends of the work piece are held during the working of the bar can be effected promptly and smoothly. Therefore, in this respect, the processing cycle can be shortened, and the second spindle can be provided with sufficient rigidity, eliminating the exertion of excessively large torsional load to the work piece. Also, the work piece can be delivered while synchronously rotating the first and second spindles by addition of the synchronous control device 53. In the case where the final working on the side of the first spindle is the machining working, such an operation is effected whereby the idle time required for acceleration of the spindle after it is once stopped can be reduced.

The aforesaid synchronous control device 53 compares signals from the spindle encoder 27 to off set and input the speed command for the phase-leading spindle in a direction of lagging it, whereas off setting and inputting the speed command for the phase lagging spindle in a direction of leading it to thereby cover the rotational characteristic and the inertia characteristic to control the speed difference and phase difference between both the spindles 11a and 11b so that they are zero. In this way, the speed commands applied from the NC device 46 to the spindle motor control portions 52a and 52b are corrected and inputted as a common command. The system for amending the speed difference and phase difference is different from the following system heretofore often used, that is, the system for causing the secondary to follow the primary but the control for following the secondary each other is employed to follow the average value of both the spindles as the target.

Thereby, the amount of correction per spindle when the phase difference and speed difference are corrected will suffice to be half of the one-side following system. More speedy following operation during the high speed rotation or rapid acceleration or deceleration can be accomplished while suppressing the servo hunting.

In the prior art control, in the detection of the speed difference and the phase difference, the deviated amount thereof is detected, and the command value corresponding to the difference thereof is obtained by calculation. In this case, however, it takes time for calculation, and repetitive period for making correction cannot be shortened. In case of the lathe which rotates at high speeds and which is short in acceleration and deceleration time, the speed difference and phase difference between both the spindles becomes changed about when the corrected value is calculated, resulting in the rough control involving a time lag, failing to maintain the synchronous precision. On the other hand, in the present invention, all the calculations obtaining from the phase difference and speed difference the correction command value so as to shorten the repetition period are omitted, and the slow or fast mode is merely discriminated and the amount thereof is disregarded. The corrected value of the set value is simply added or subtracted to obtain the command value. The set correction value per unit is individually set in advance in consideration of the characteristic of individual motors and is set by the individual working program in consideration of the mass of the work or the like. Thereby, the repetitive period of the correction operation is a millisecond unit. Correction can be made almost continuously. By setting the adequate unit correction value, prompt synchronous control can be accomplished without occurrence of hunting.

With respect to the sampling of the signal of the encoder, the phase difference between both the spindles is discriminated to control the acceleration during the acceleration and deceleration operation, whereas the speed difference is discriminated during the constant speed operation to control the speed. Then, a large torsional torque which involves a danger acting on the work piece during the acceleration and deceleration can be positively prevented, and the hunting during the constant speed operation can be effectively prevented.

In the case where when a predetermined correction value is inputted, if the speed difference or phase difference is less than a certain fixed value, there is formed an unsensitive zone so as not to issue a correction signal from the synchronous control device, so that control hunting can be prevented to stabilize the operation. In the case where both the spindles are operated at the independent rotational speed, the synchronous control device is cut off by the switch 57 to thereby sufficiently correspond to the independent operation of each of the spindles.

After the work 16 has been delivered to the second spindle 11b, the second spindle 11b is moved in the direction away from the first spindle stock 2b, and works the back side of the work piece in cooperation with the second tool rest 3b. The working shape of the work piece 16 at that time is decided by the movement of the second spindle stock 2b in the direction of Z and the movement of the second tool rest 3b in the direction of X. During that period, a next work piece is supplied to the first spindle 11a, and the previous work piece 16 and the next work piece 16 are simultaneously worked as shown in FIG. 4. Upon termination of working in the second working unit 17b, the previous work piece 16 is ejected outside the machine, and the second spindle stock 2b moves to grip the next work piece 16 having been worked in the first spindle stock 2a. Work pieces are successively worked in the manner as described.

Cutting liquid is applied to the work piece during machining, and chips broken by a chip breaker flow down along with the cutting liquid on the cover 18 and drop into the chip receiving box 4 on this side of the base. The chips in the chip receiving box 4 are delivered to the chip bucket installed by the machine by means of the chip conveyor 5, and the cutting liquid is filtrated for reuse.

In the working involving the delivery of the work piece between the first working unit 17a and the second working unit 17b, as shown in FIG. 4, a command is applied to the first working unit 17a under the first working program A with a work piece delivery program $J_A$ added to the end thereof, and a command is applied to the second working unit 17b under the second working program B with the piece work delivery program $J_B$ added to the head thereof.

On the other hand, in the case where the apparatus of this invention is used to effect the working of the program A portion of the work piece 16 shown in FIG. 4, for example, along with the first working unit 17a and the second working unit 17b, as shown in FIG. 5, a command is applied to both the working units under the same working program A. At that time, the rightward movement of the first tool rest 3a and the rightward movement of the second spindle stock 2b are the movement in the direction in which the tool moves away from the spindles 11a and 11b, and the relative moving relationship between the work piece 16 and the tool is the same as the first working unit 17a and the second working unit 17b. Accordingly, the command for the movement in the direction of X to be applied to the first tool rest 3a is applied to the second tool rest 3b without modification, and the command for the movement in the direction of Z to be applied to the first tool rest 3a is applied to the second spindle stock 2b. Then, exactly the same working as that to be accomplished in the first working unit 17a can be carried out also in the second working unit 17b under the same program. The working program A applied to both the units may be of exactly the same one.

In the device of this invention, the spindle indexing and driving device 23 having great reverse resistance is engaged with spindles 11a and 11b. Therefore, the milling working of powerful contouring can be accomplished simultaneously and in parallel and with the phase of the back working coincided, and a turret with milling tools unit or the like is naturally mounted on the tool rest, also on the second tool rest 3b. The slant type base 1 for better access to the machine during the maintenance work of the tools is employed, and the chip receiving box 4 is arranged frontwardly of the machine to promote quick discharge of chips and quick scattering of cutting heat.

BRIEF DESCRIPTION OF THE DRAWINGS

The drawings show a 2-spindle opposed type CNC lathe of this invention.

FIG. 13 is a view showing an example of a slow and fast discriminating circuit, FIG. 14 is a view showing a spindle encoder, and FIG. 15 is a view illustrating a pulse delivered in the slow and fast discriminating circuit.

BEST MODE FOR CARRYING THE INVENTION (1) Whole Structure (see FIGS. 1 to 5)

Figure 1:
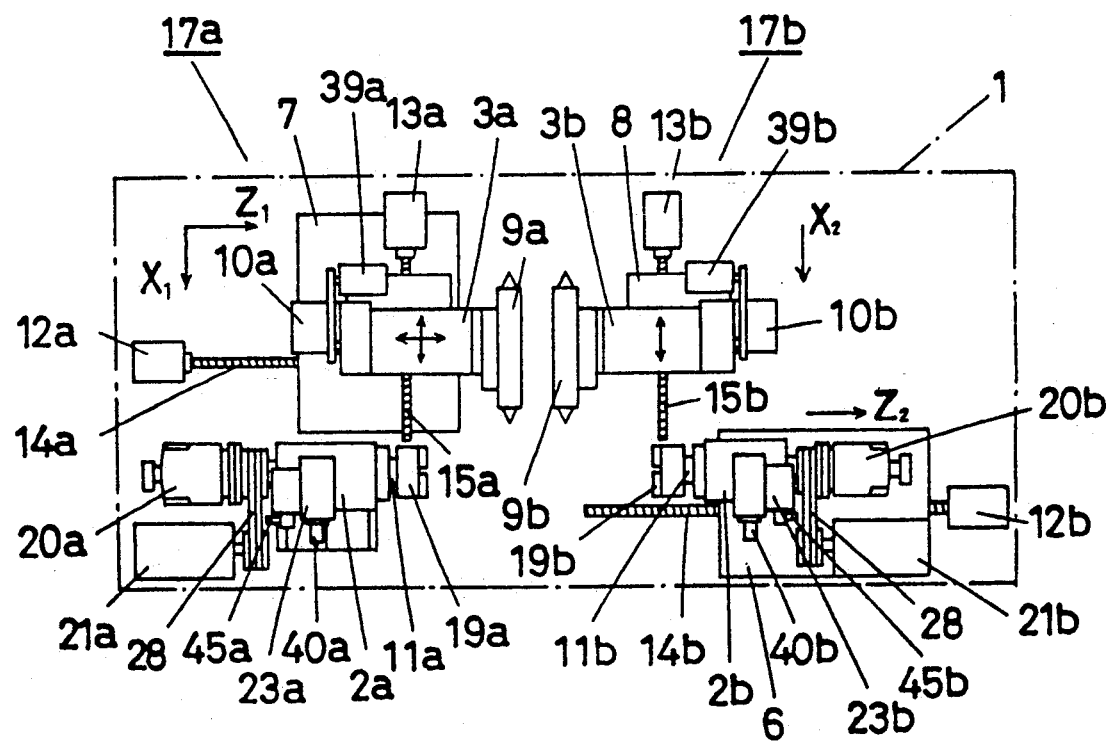
FIG. 1 is a view showing arrangement of instruments and devices on the base.

In the description of this invention, the spindle direction is referred to as the Z axis direction, and the direction perpendicular to the Z axis is referred to as the X axis direction (see FIG. 1). In the figures, reference numeral 1 designated a base, 2a a first spindle stock, 2b a second spindle stock, 3a a first tool rest of a turret type, 3b a second tool rest of the same type, 4 a chip receiving box, and 5 a chip conveyor. The base 1 is of the slant type in which the upper surface thereof is inclined on this side through 45 degrees, the second spindle stock 2b opposed to the first spindle stock 2a secured to the base is arranged slidably only in the Z axis direction through a Z slide 6, and the tool rests 3a and 3b are arranged in the deep side of the spindle stocks 2a and 2b. The first tool rest 3a is slidable in both the Z and X directions through a ZX slide 7 provided with a Z slide and an X slide, and the second tool rest 3b is mounted slidably only in the X axis direction through an X slide 8.

The tool rests 3a and 3b are provided with turrets 9a and 9b, respectively, on which are mounted a plurality of tools including rotary tools such as milling and drill or the like, each of said turrets being indexed and driven by index motors 10a and 10b to select tools and firmly secured to the tool rests 3a and 3b by face gear couplings at each index position. The rotary tool mounted on the turret is rotated and driven by a milling motor 39. The work mounted on the first spindle stock 2a and the work mounted on the second spindle stock 2b are worked by the tool of the first tool rest 3a and the tool of the second tool rest 3b, respectively.

Figure 4:
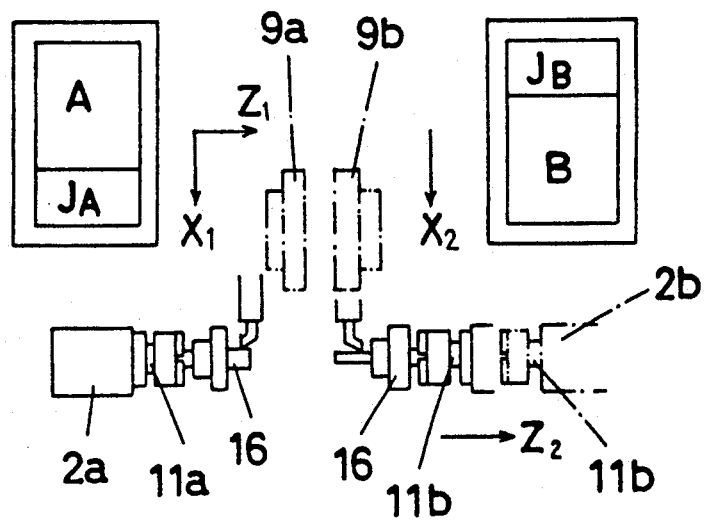
FIGS. 4 and 5 are explanatory views showing the relation with the control program.
Figure 5:
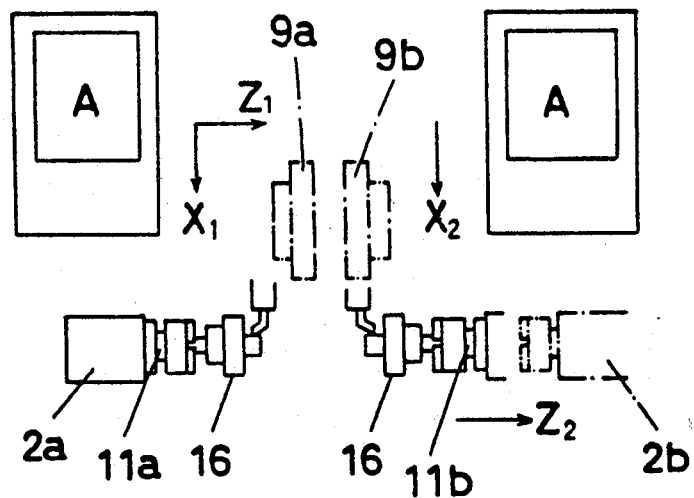

The position of the first turret 9a and the second turret 9b and the second spindle 11b shown by the imaginary lines in FIGS. 4 and 5 is the position of the original point. The positional relationship between the turrets 9a, 9b and the spindles 11a, 11b is symmetrical to left and right at the position of the original point.

On the slides 6, 7 and 8 are respectively provided with feed devices composed of feed motors 12a, 12b, 13a and 13b, feed screws 14a, 14b, 15a and 15b and ball nuts not shown. Movement and locating of the second spindle stock 2b and the first and second tool rests 3a and 3b are carried out by controlling the rotational angles of the feed motors 12 and 13.

The 45° slant type base is employed in the device of the present embodiment for the reasons that chips are promptly discharged which will be described later and the workability when the tool on the turret is replaced is taken into consideration, that a loader and an unloader can be arranged at a suitable position upwardly and frontwardly of the machine, and that exeption of excessively large load on the side on the slide surface of the spindle stock 2 and the tool rest 3 is avoided. In the actual construction, three slideways are integrally provided on the upper surface of the base 1 by cutting-out to increase the rigidity to thereby reduce the increase in cost caused by a lamination.

Figure 2:
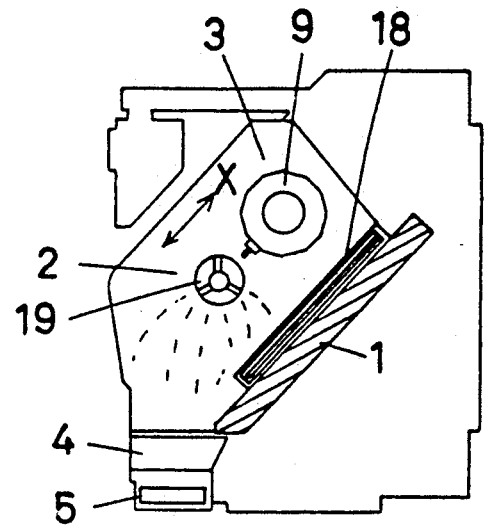
FIG. 2 is a schematic sectional view of the device.
Figure 3:
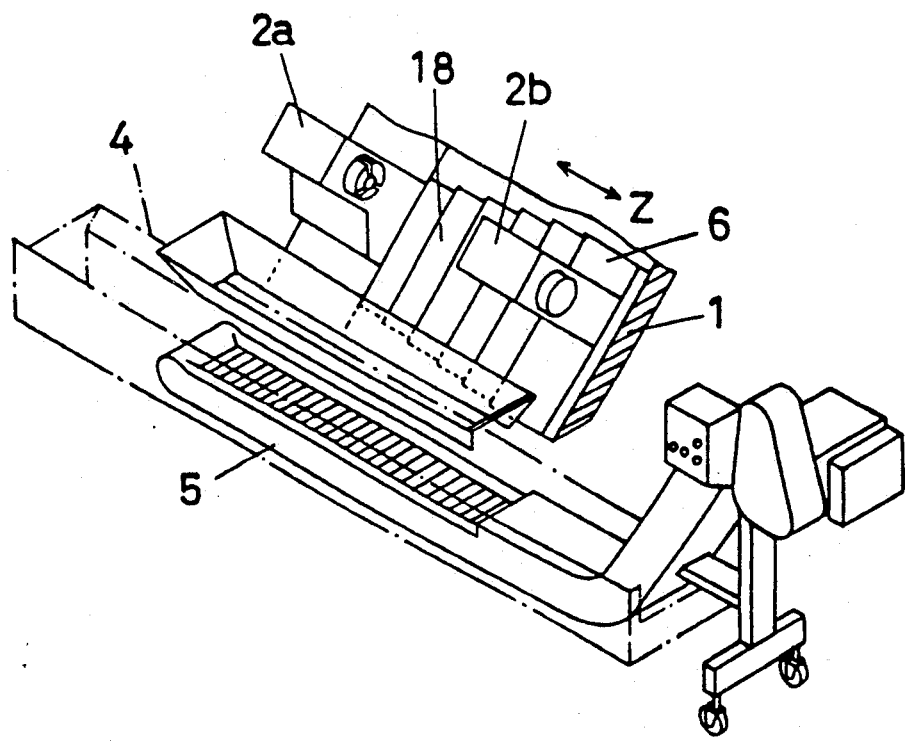
FIG. 3 is a perspective view showing a chip ejection system.

(2) Chip Receiving Box (see FIG. 2 and 3)

The chip receiving box 4 is detachably arranged at the lower part of the front edge of the base 1, and the upper surface of the base 1 in the working area formed between both the spindle stocks 2a and 2b is covered with an expansible cover 18 mounted between the Z slide 6 of the second spindle stock and the first spindle stock 2a. The chip conveyor 5 is laterally arranged on the bottom surface of the chip receiving box 4. Accordingly, the chips produced in the working area slide down on the cover and drop into the chip receiving box 4, and thence are promptly discharged sideward of the machine by the chip conveyor 5.

In the machining, a heavy cutting tool is used in order to complete rough cutting in a minimum time, and the work is rotated at the high speed and the tool is fed at high speed to effect rough cutting. Because of this, working heat is generated considerably. Therefore, cutting liquid is applied to cool the chips to promptly remove the produced chips from the working area. This is an important requirement for preventing thermal deformation of the machine and the work to maintain high working precision. Accordingly, the treatment of chips is one of the most important problems in the machine of this kind. This problem is solved by employing the above-described construction in the machine in the present embodiment. The chip conveyor 5 may have the construction in which chips are discharged at the rear of the machine. However, the rear discharge type need have the construction in which the chips are moved toward the center of the chip receiving box. Since the conveyor moves in the central portion of the base, rendering the maintenance work inconvenient. Generally, a number of control devices are arranged at the back of the machine, and therefore, the aforesaid type is not preferable for the maintenance of the control devices.

Figure 6:
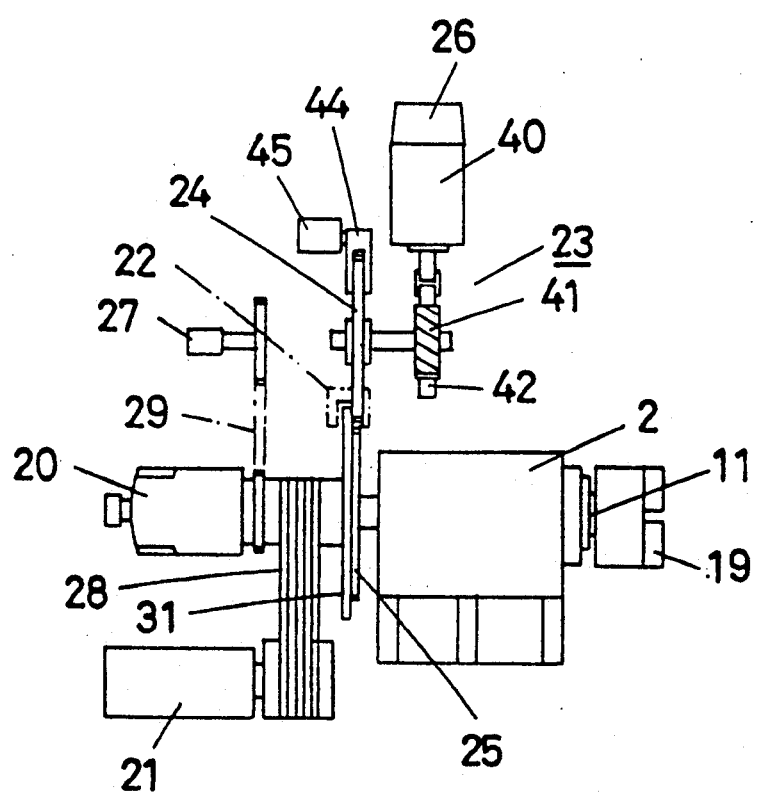
FIG. 6 is a view showing the internal construction of a spindle stock with instruments and devices developed.

(3) Spindle Stock (see FIGS. 1 and 6)

Mounted on the spindle stocks 2a and 2b are respectively spindles 121, chucks 129 secured to the spindles, chuck cylinders 20 for opening and closing the chuck, spindle motors 21, brake devices 22, spindle indexing and driving devices 23, paired shift gears 24, 25 for engaging and disengaging the spindle indexing and driving devices and the spindles, and encoders 26 and 27. The spindle motor 21 drives the spindle 11 by transmission of a V-belt 28, and the rotational angle of the spindle 11 is detected by the spindle encoder 27 connected to the spindle 11 by a timing belt 29.

Figure 7:
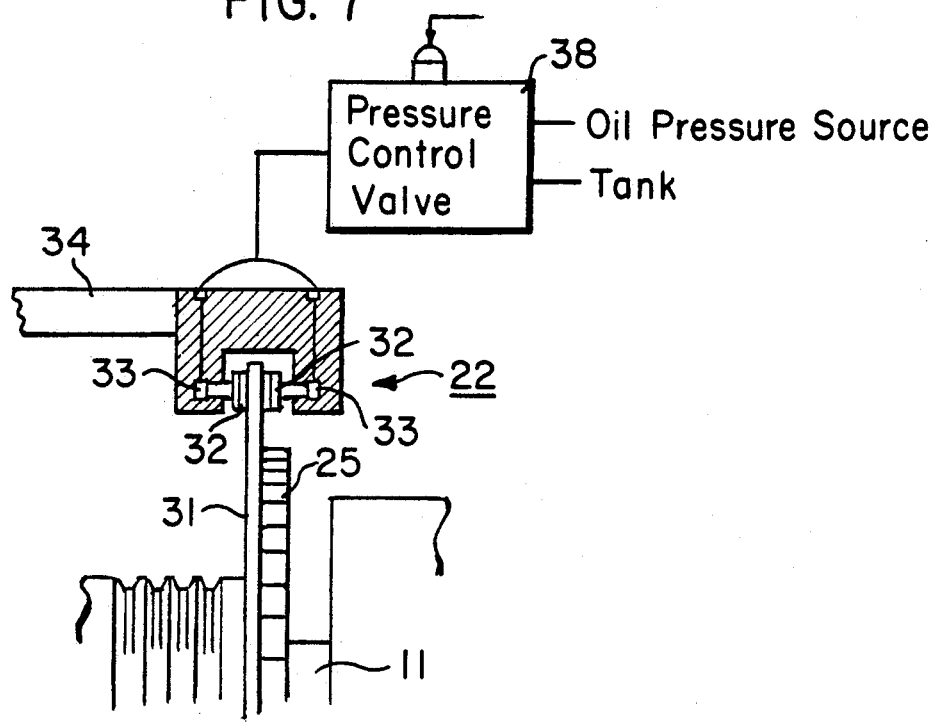
FIG. 7 is a detailed view of a brake device.
Figure 8:
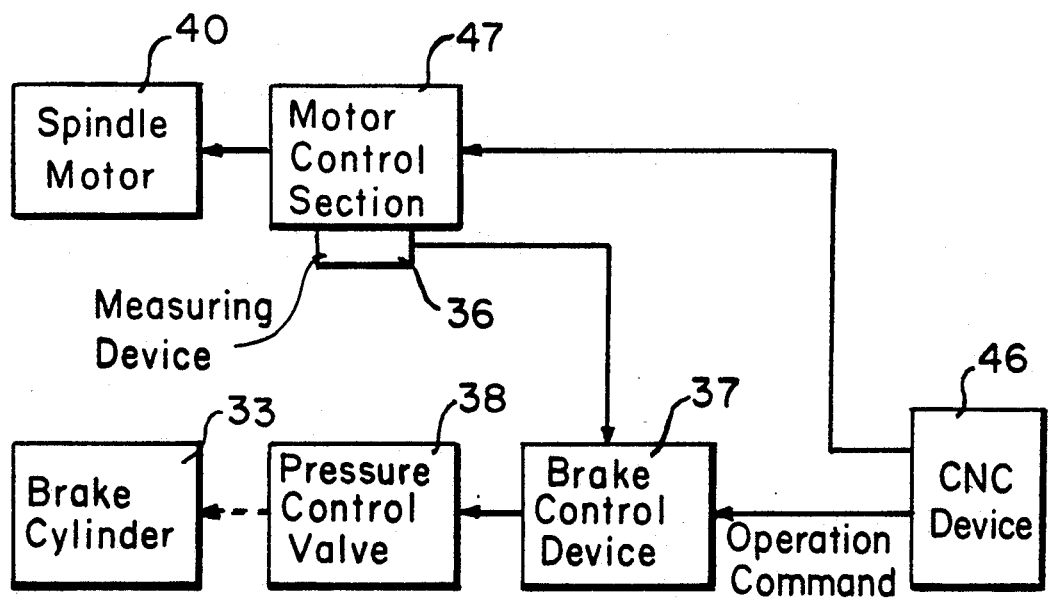
FIG. 8 is a block diagram showing a control system of the brake device.

(4) Brake Device (see FIGS. 7 and 8)

The brake device 22, in the case where the angle of the spindle is required to be maintained, clamps the spindle 11 with full power. In case of milling, the brake device is set to half brake to freely automatically control the braking force. In the present embodiment, a disk brake is employed, which comprises a brake disk 31 secured to the spindle 11, brake shoes 32 for holding the brake disk and brake cylinders 33. The brake device 22 is secured to the spindle stock 2 through a bracket 34. The brake device 22 may be of the other construction but the construction capable of automatically controlling the braking force is employed. In the present embodiment, the hydraulic pressure of the brake cylinder 33 is controlled to adjust the braking force.

The operation of the brake device 22 will be described in detail with reference to FIG. 8. For example, in the case where milling of a contouring is intermittent cutting, the spindle 11 sometimes vibrates. The brake device 22 has a function to damp the vibration of this kind, namely oscillation. To this end, brake is applied to the spindle 11 and its braking force is varied according to the magnitude of working reaction. In the present embodiment, a measuring unit 36 for measuring a driving force of a servo driver 47 is mounted thereon for controlling an index motor 40 of the spindle indexing and driving device 23 so that an output signal thereof is supplied to a brake control device 37. The signal outputted from the brake control device 37 enters a pressure control servo valve 38 to adjust the oil pressure of the brake cylinder 33. In this embodiment, output of the index motor 40 when the spindle 11 is rotated at a low speed for milling with no-load is set to a predetermined value (when brake is not applied, only a very small output is provided) to adjust in advance the oil pressure for brake so as to keep balance. When the load of the index motor 40 becomes larger than the preset value, the brake pressure is automatically controlled by the control device 37 in a direction of loosening the brake by that amount. In this way, as the milling starts to produce a load, the braking force decreases, and the index motor 40 continues to rotate while maintaining a fixed range of output. Even if the load of milling varies, it will not be a variation of torque of the spindle indexing and driving device 23, and the vibration of the spindle is effectively suppressed to effect working in a stabilized manner.

Figure 9:
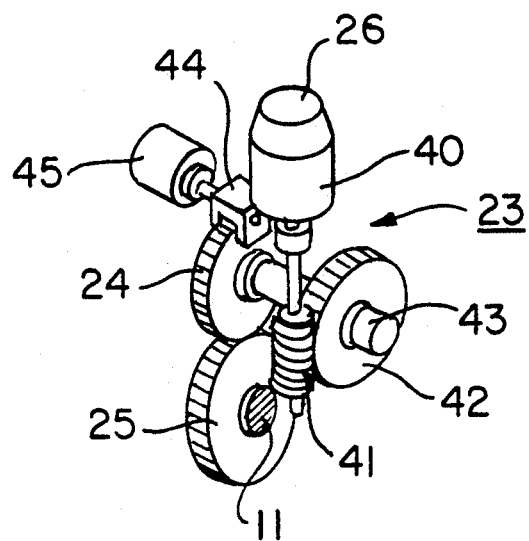
FIG. 9 is a perspective view of a spindle indexing and driving device.
Figure 10:
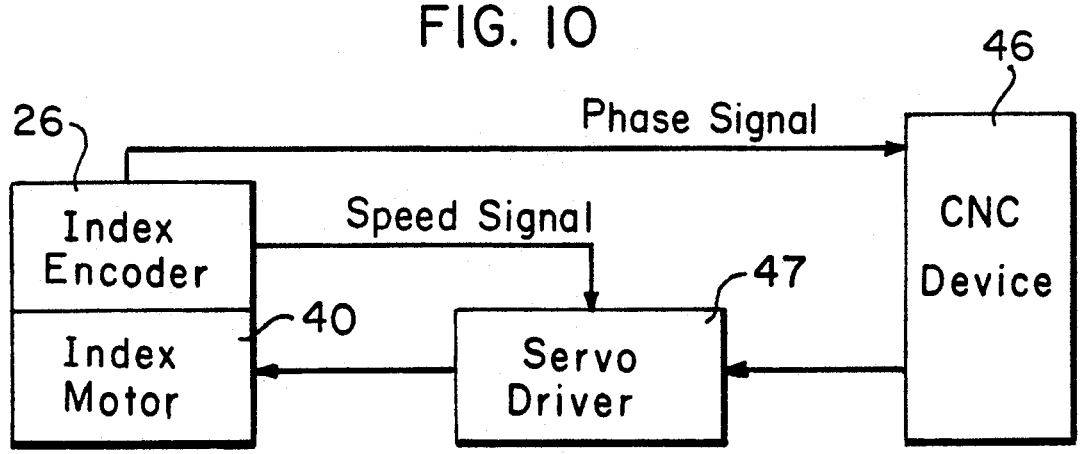
FIG. 10 is a block diagram showing a control system of an indexing motor.

(5) Spindle Indexing and Driving Device (see FIGS. 9 and 10)

The spindle indexing and driving device 23 is composed of an index motor 40 housing therein an encoder 26, a worm 41 secured to the output shaft thereof, a worm wheel 42 meshed therewith, a shift gear 24 axially movably mounted on a worm wheel shaft 43 by a precise spline, a gear 25 secured to the spindle 11, a shift fork 44 and a shift cylinder 45.

The gear 25 and the shift gear 24 are a precise gear having the same number of teeth. In working of machining, the shift gear 24 is moved rightward on FIG. 9 by the shift cylinder 45 to release tee engagement with the gear 25. The spindle 11 is rotated at a high speed by the spindle motor 21. In working of milling and working of boring, the shift gear 24 is moved in the reverse direction to mesh with the gear 25. The rotation of the index motor 40 is reduced by the paired worm gears 41 and 42 to rotate the spindle 11 so that milling of a contouring can be accomplished while effecting locating and rotation at a predetermined angle. A harmonic drive type reduction machanism or a differential reduction mechanism may be employed in place of the paired worm gears 41 and 42. Precise angle locating of the spindle 11 can be made by using a large reduction ratio. The number of divisions of angles on the spindle 11 of the indexing encoder 26 in the present embodiment is 360,000. With respect to the engaging and disengaging device of the spindle indexing and driving device 23 and the spindle 11, a meshing type mechanical clutch or the like can be used in place of the shift gear, and an air pressure type or electric type may be used for driving the them. In short, the spindle indexing and driving device 23 is independently provided on two spindles 11a and 11b of the 2-spindle opposed type lathe. In the spindle indexing and driving device 23 in the present embodiment, there is employed the construction in which the motor output is transmitted to the spindle 11 through a high reduction ratio mechanism comprising paired worm gears having a large reverse resistance to increase the reverse driving resistance of the spindle 11, providing a feauture in which heavy cutting milling can be made.

The index motor 40 is controlled by a servo driver 47 (FIG. 10) which receives a command from a CNC device 46. Output of the index encoder 26 is supplied as a speed signal to the servo driver 47, the speed thereof is subjected to feedback control and a phase signal from the index encoder is fed to the CNC device 46. When the spindle is located at a predetermined angle, the CNC device 46 provides a stop command to the servo driver 47. The indexing operation is carried out by rotating the index motor at a high speed, and at the indexing position, the brake device 22 firmly locks the indexing position. In the case of milling of a contouring, the CNC device 46 commands the feed speed to the servo driver 47, which in turn rotates the spindle 11 at a speed commanded by the feedback control.

When the spindles 11a and 11b are rotated by use of the spindle indexing and driving devices 23a and 23b, powerful continuous milling becomes possible. At that time, half brake is applied to the spindle by the brake device 22 as the case may be to prevent the spindle from being vibrated due to the variation of load. Since the phase of the spindle during the delivery of the work can be set by a program of the CNC device 46, various deliveries and workings of the work which are rich in change can be thus enabling the provision of an effective composite working machine as well as an increase in rigidity of the afore-mentioned first spindle.

Figure 11:
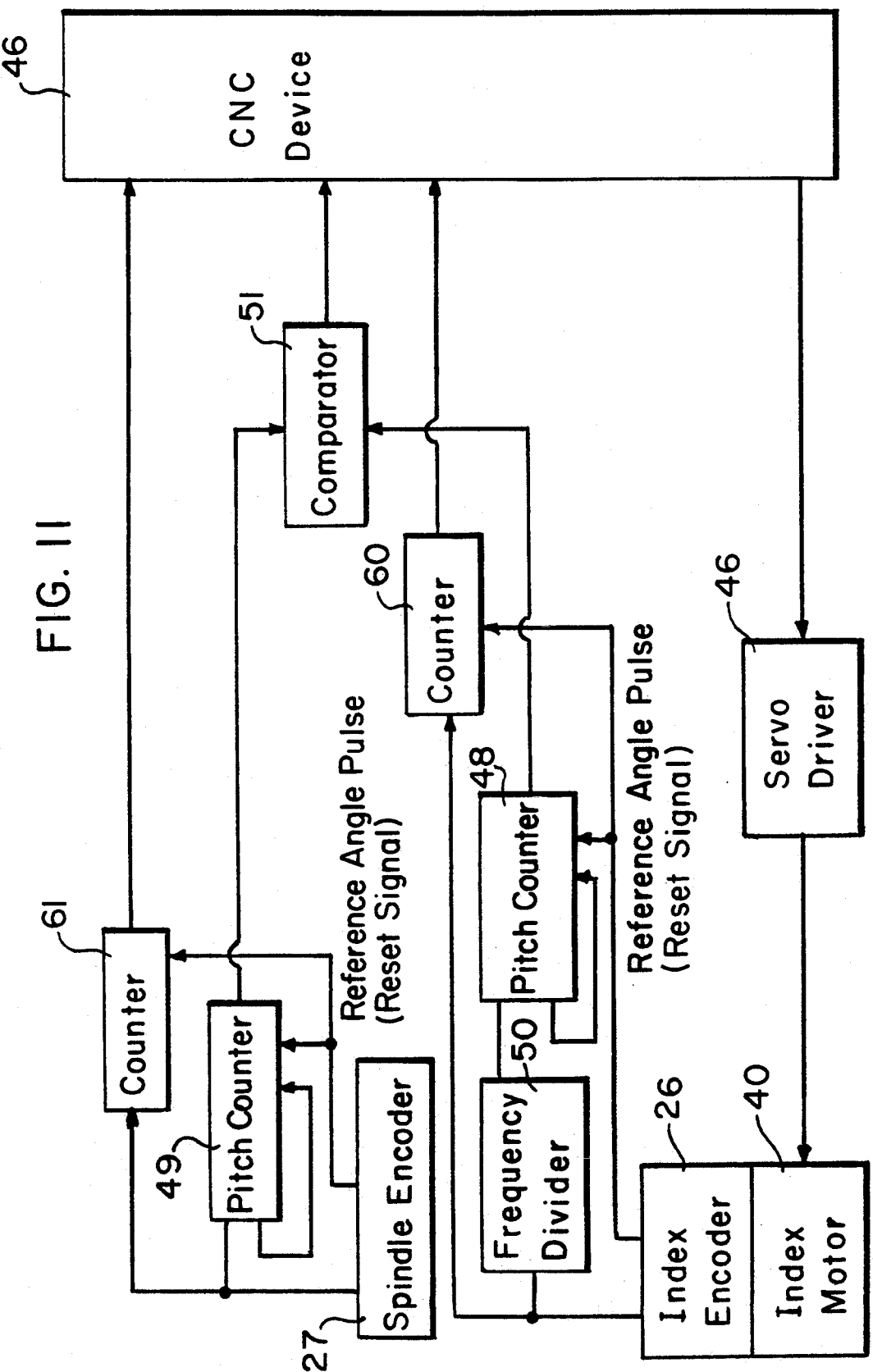
FIG. 11 is a block diagram showing a connection control system of a spindle and an indexing and driving device.

(6) Connecting Device of Spindle Indexing and Driving Device (see FIG. 11)

In this embodiment, pitch counters 49 and 48 are provided on the spindle and indexing encoders 27 and 26 as shown in FIG. 11. This pitch counter is a counter as the maximum count number, that number of pulses issued by the spindle encoder 27 when the spindle rotates through an angle corresponding to the circular pitch of the gears 24 and 25. Therefore, they detect the phase from the meshing of the gears 24 and 25. The pitch counters 49 and 48 are reset by the count-up pulse and the reference angle pulse of each encoder (the pulse outputted when the spindle and the spindle indexing and driving device assume a reference position phase). Accordingly, the pitch counters 49 and 48 start counting when the spindle 11 and the spindle indexing and driving device 23 assume a reference position phase and are reset each time when the gears 25 and 24 rotate through one circular pitch to start new counting, and therefore if the counted number of the pitch counter 49 is equal to that of the 48, the shift gear 24 can be meshed with the gear 25. A frequency divider 50 is to rough the number of division of the indexing encoder 26 to the number of division of the spindle encoder. For example, if the number of division of the spindle encoder is 3,600, and the number of division of the indexing encoder 26 is 360,000, the number of frequency division of the frequency divider 50 is 100. To connect the spindle indexing and driving device 23 with the spindle 11, the CNC device 46 provides a command of rotation to the index motor 40 through a difference in value between the pitch counters 49 and 48 detected by a comparator 51 to locate the gears 24 and 25 at the meshing position.

Thereby, this can eliminate the orientation operation of the spindle 11 when the spindle indexing and driving device is connected thereto. The spindle 11 is rapidly decelerated and stopped as it is. The stopped angle position thereof is detected by the pitch counter 49 of the spindle encoder 27, and the spindle indexing and driving device 23 can be rapidly located so as to meet the detected angle position to render possible the connecting operation of the spindle indexing and driving device 23 to the spindle 11. As the index motor 40, a servo motor is used, and therefore, even if the spindle is rapidly stopped, no deviation in position occurs, and the connecting operation can be terminated in a short period of time.

To employ the aforesaid construction, the pitch precision of the connecting gears 24 and 25 need be sufficiently enhanced. When the pitch precision of the gears 24 and 25 cannot be expected, the capacity of the pitch counters 49 and 48 of FIG. 11 is increased so that the rotationl angles of the gears 25 and 24 from the reference position phase are counted by the pitch counters 49 and 48, and the spindle indexing and driving device 23 is rotated through a count difference detected by the comparator 51. In this case, the meshing position of the gears 25 and 24 is always constant, and therefore the maintenance of precision is easy.

According to this structure, an absolute encoder is merely used as the spindle encoder 27 to render possible the connecting operation with idle time considerably shortened. With this, the orientation mechanism heretofore required need not be provided to render possible a great cost down in terms of mechanical construction.

While the embodiment of FIG. 11 is shown by a circuit block diagram, it is to be noted that the similar operation can be performed by the program of the CNC device. The device controlled by such a program as just mentioned can be employed as a connecting device of the spindle indexing and driving device. This is also true for a phase adjusting device of the spindle.

(7) Phase Adjusting Device of Spindle (see FIG. 11)

The phase adjusting of the spindles 11a and 11b when the work is delivered is carried out in a manner such that the values of counters 60 of the first and second indexing encoders are read by the CNC device 46, and a command for rotation is provided for either index motor so that both are in coincidence or commands for rotation in both normal and reverse directions in the direction in which both are in coincidence are provided for both the index motors 40.

A servo motor is used as the index motor whereby phase matching of the spindles 11a and 11b in the aforesaid construction can be carried out in a very short period of time.

(8) Spindle Motor Control Device (see FIGS. 12 to 15)

Figure 12:
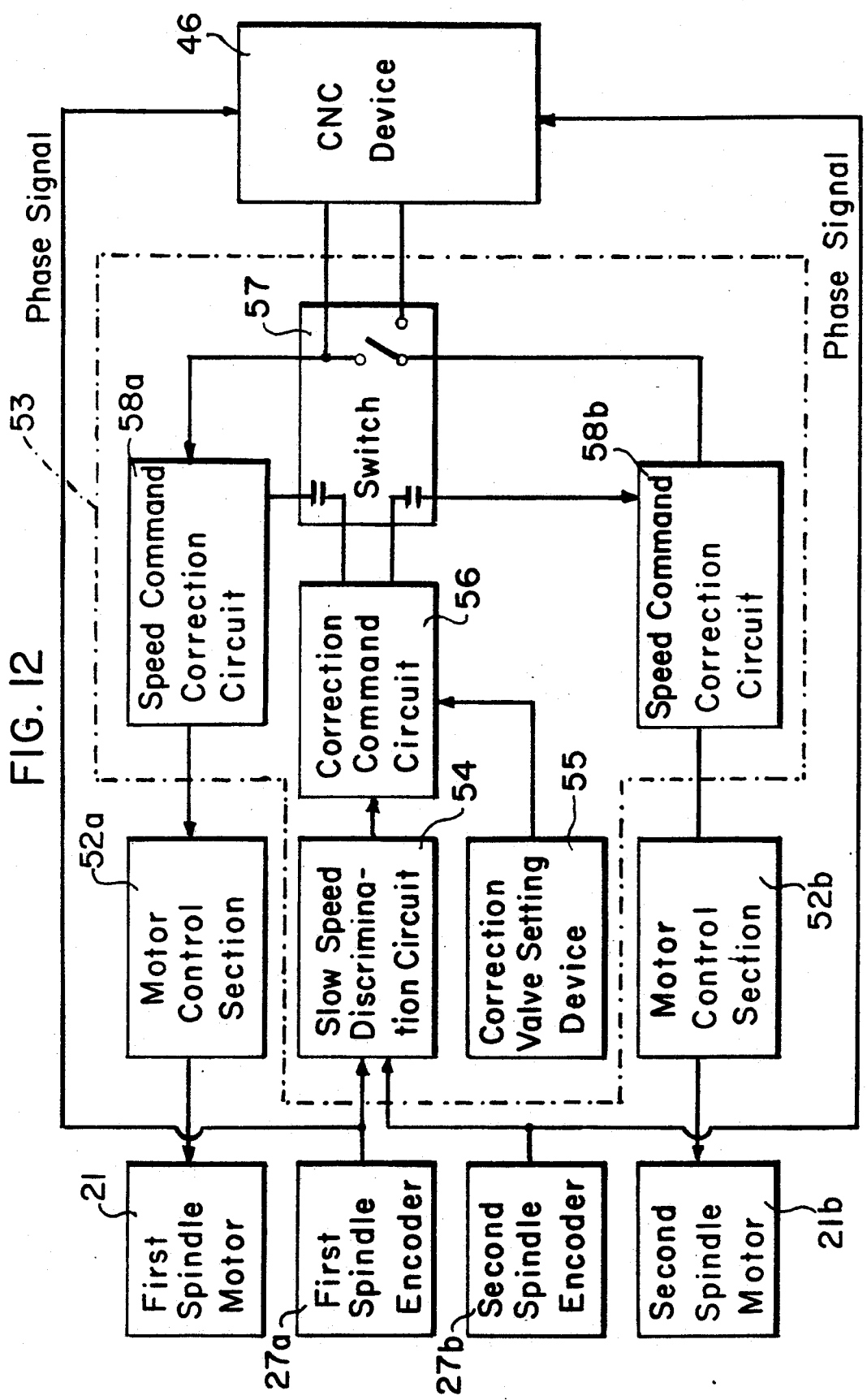
FIG. 12 is a block diagram showing a control system of a spindle motor.

A control block of the spindle motor 21 is shown in FIG. 12. When the first and second spindle motors 21a, 21b are individually operated, the motor control portions 52 which have received the individual speed commands from the CNC device 46 individually control their speeds. A synchronous control device 53 surrounded by the phantom line comprises a slow and fast discriminating circuit 54, a correction value setting unit 55, a correction command circuit 56, a switch 57 and first and second speed command correction circuits 58a and 58b. The slow and fast discriminating circuit 54 counts output pulses of the spindle encoders 27a and 27b in a fine time of millisecond unit and monitors whether or not a phase difference and a speed difference between the first spindle and the second spindle according to the magnitude of the counted pulses occur.

FIG. 13 shows an example of the slow and fast discriminating circuit 54, in whcih count pulses of the spindle encoders 27 are cut by predetermined widths and then counted by counters 63a and 63b, the difference therebetween is discriminated by a comparator 64. The spindle encoders 27 each have a reference phase detection slit 65 (FIG. 14) for generating a reference angle pulse at every predetermined angle, and the reference angle pulses are each inputted through a one shot circuit 66, an AND gate 65 and an OR gate 68 to an AND gate 69 which cuts the count pulse. On the other hand, an acceleration signal and a deceleration signal from the spindle motors 21 are formed into a common signal (acceleration and deceleration signal) P in an OR gate 70, which is then supplied to the AND gate 67 and then supplied to the OR gate 68 via an inverter 71. There is provided a one shot circuit 72 for defining the width of count pulses, which circuit is triggered by a timing pulse TP provided at a predetermined interval (sampling time interval), and an output thereof is made as an input signal to AND gates 69a and 69b. While in FIG. 13, a part of the circuit on the side of the second spindle is omitted, it is of course that circuits similar to the circuits on the side of the first spindle with an addition a are provided on the side of the second spindle. The acceleration signal and the deceleration signal may be outputted when two count values before of the counters 63a and 63b are compared with the previous count value and if the resultant count value is larger or smaller than an allowable value.

In the above-described structure, when the spindles 11a and 11b are being driven at a constant speed, the acceleration and deceleration signal P is at an L level so that the output of the OR gate 68 is maintained at a H level by its inversion through the inverter 71, and therefore, the count pulses with the pulse width of the one shot circuit 72 are provided as shown in FIG. 15(a). If there is a difference in speed between the first spindle 11a and the second spindle 11b, a difference in count value occurs between the first counter 63a and the second counter 63b, large or small of which is discriminated b the comparator 64. When the spindles 11 are in the acceleration and deceleration, the pulse of the one shot circuit 66 triggered by the reference angle pulse after the pulse of the one shot circuit 72 has been risen is risen, and then the output pulses of the encoders 27a and 27b are counted. Therefore, the count start time on the side in which the phase is early becomes early. Even if the speed is the same, the count value on the side in which phase is early becomes large (FIG. 15(b)). Accordingly, count values of the first counter 63a and the second counter 63b are compared similarly to the case of the constant speed rotation whereby the phase difference can be discriminated.

A speed correction value provided every unit time interval is set in the correction setting unit 55. This correction value may be provided by the CNC program as previously mentioned. The correction command circuit 56 receives the output of the slow and fast discriminating circuit 54 to apply the correction value set in the correction value setting unit 55 as a subtraction or addition command to the speed command correction circuits 58. Of course, the correction value as the subtraction command is applied to the side in which the phase and the speed are gained whereas the correction value as the addition command applied to the side in which the phase and the speed are delayed. The speed command correction circuit 58 adds and subtracts the correction value from the speed commands provided by the CNC device 46 to apply the speed commands to the motor control units 52.

When the first spindle 11a and the second spindle 11b are synchronously driven, the switch 57 is switched so that the speed command on the first spindle side is applied to both the first and second control units 52a and 52b, and by switching the switch 57 the correction signal is applied to the speed command correction circuits 58. The correction value is supplied as a subtraction input to the side in which the phase is gained while the correction value is supplied as an addtion input to the side in which phase is delayed, and a series of control cycles are continuously carried out at a short time interval to thereby cause the first spindle 11a to be synchronized with the second spindle 11b.

While in the above-described embodiment, the synchronous control device is shown by the hard structure for better understanding, it is to be noted that the device can be constituted by software of a computer. Actually, the software structure is preferable because the flexibility is high.

INDUSTRAIL APPLICABILITY

According to the construction of the 2-spindle opposed type CNC lathe of this invention, since two tool rests are both positioned in the deep side of the spindles, accessibility to the spindles is good, workability when the work is mounted and removed is good, and no danger involves during work. These effects are further promoted by use of the slant type base.

Furthermore, since the first spindle stock is fixed, a sufficient rigidity can be applied to the first spindle stock. There poses no problem in that during working of a bar, a blank on the bar feeder is axially moved. An existing bar feeder can be used without modification. The first tool rest can be moved in the direction of Z to effect mounting and removal of the tool on the turret and maintenance and inspection of the tool rest with ease.

Moreover, since the chips or cutting liquid are promptly discharged into the chip receiving box installed on this side of the base, thermal deformation of the machine body can be minimized, and various constructions of loader and unloader for the work can be utilized without modification.

In addition, connection of the spindle indexing and driving devices to the spindles and phase matching of the first and second spindles can be accomplished very promptly, and one continuous composite working for the work including the back working and indexing can be enhanced greatly in its working ability. Since indexing locating and low speed rotation feed are applied to the spindles by the independent spindle indexing and driving devices, the reverse resistances of the spindles at the time of these workings can be increased. It is possible to provide a 2-spindle opposed type CNC lathe provided with a powerful working ability as well as an increase in rigidity of the first spindle as previously mentioned.

According to the synchronous control device of this invention, the phase or speed difference between the first spindle and the second spindle can be detected at very short time interval to correct the speed commands issued to the spindle motors without delay of time and continuously. Therefore, the phase and speed of two spindles can be accurately synchronized during the constant speed driving as well as during the rapid acceleration and deceleration driving. Further, since the control construction is simple, it can be easily carried out. The set value is set by the CNC device so as to meet the size of the work and the working situation thereof to thereby positively avoid hunting and torsional stress acting on the work.

In addition, in the lathe of this invention, the first working unit and the second working unit can use the same NC program when the same works are simultaneously worked to reduce the processes in preparation of programs. If the moving directions of the first tool rest and the second spindle stock in the direction of Z are the same (for example, rightward movement), the relative moving relation between the tool and the work is also the same (for example, the direction in which the tool is apart from the spindle), and therefore, operation mistake during the manual operation can be avoided, and collision trouble of works resulting from the operation mistake can be positively prevented.

We claim:

1. In a CNC controlled lathe for forming a work piece into the shape of a rotary body, said lathe having a base and a pair of opposing spindle stocks and associated first and second turret type tool rests located on said base, the first spindle stock being fixedly mounted on the base, the first tool rest being mounted on a ZX slide movable in a direction parallel to the spindle stocks and in a direction at a right angle to the spindle stocks, the second spindle stock being mounted on a Z slide movable only in a direction having an axis parallel to the axes of said spindle stocks, the second tool rest being mounted on an X slide movable only in a direction at a right angle to the direction of the spindle stocks, said first and second tool rests being arranged to the rear of their associated spindle stocks, the improvement wherein the base is arranged at a forwardly directed incline, and the respective first and second spindle stocks are each provided with driving means for rotating said spindles and provided with indexing and driving means for moving said spindle stocks, an encoder for detecting the phase of the spindle, and an encoder for detecting the phase of the spindle stock indexing and driving means, means for mechanically connecting and disconnecting the respective spindles, including a CNC device for selectively controlling the connection and disconnection of the spindle driving means and the spindle stock indexing and driving means with the respective spindles.

2. The lathe according to claim 1, including an expandible cover arranged between the first spindle stock and the second spindle stock to cover the upper surface of the base and a chip receiving trough removably mounted at the lower edge of the base.

3. The lathe according to claim 2, wherein the spindle indexing and driving means comprises an index motor having an encoder for detecting an angular position, reduction mechanisms, a pair of gears, and means engaging and disengaging said gears.

4. The lathe according to claim 1 or 3, wherein each spindle stock is provided with a brake device capable of adjusting the load force applying rotation to the spindle.

5. The lathe according to claim 1, wherein said CNC device and encoder includes for sensing the difference between actual phase of said first and second spindles and a reference position phase so that the first spindle and the second spindle are matched in phase.

6. The lathe according to claim 5, including means for rotating said spindles in opposite direction to match the phases of the first and second spindles.

7. The lathe according to claim 3, including means for detecting the meshing position of the shift gears of the first and second spindles in response to the reference position phase and the actual phase of the spindles detected by the spindle encoder and a reference position phase and an actual phase detected by the indexing encoder, and means operable in response to a command from the CNC for connecting the spindle indexing and driving device to the spindle to rotate the spindle indexing and driving device to the meshing position defined by the actual phase of the spindle encoder to mesh the shift gears.

8. The lathe according to claim 5 or 7, including a synchronous control device for synchronously rotating the paired spindle motors.

9. The lathe according to claim 8, wherein the synchronous control device includes means for detecting whether the difference between the two spindles is slow or fast from the numbers of pulses issued by both spindle encoders, means for storing a set of fine correction values, and means for reversing said fine correction values when said slow and fast are directed to apply it to respective spindle motor control units.

10. The lathe according to claim 1, having a spindle synchronous control device for a machine tool individually operating two spindles having mutually independent rotary driving devices and for synchronously controlling the both spindles to effect acceleration and deceleration and constant speed rotation, including endoers for detecting the rotational speed and the relative phase of each spindle, a slow and fast discriminating circuit for measuring signals generated therefrom relative to a given unit time to compare mutual large and small relation therebetween, a correction value setting unit for setting a correction value of one unit, speed command correction circuits for correcting speed commands given from the NC device to the motor control units for controlling rotation f each spindle, and a correction command circuit for inputting said correction vlaue of said one unit as an addition or substruction signal to said speed command correction circuit in response to the output of said slow and fast discriminating circuit, and means for repeating the correcting operation at predetermined time intervals.

11. The spindle synchronous control device according to claim 10, wherein the slow and fast discriminating circuits detects and compares a phase difference between the spindles at the time acceleration and deceleration of the spindles, and detects and compares rotational speed diferences between the spindles at the time of constant rotation of the spindles.

* * * * *

UNITED STATES PATENT AND TRADEMARK OFFICE
CERTIFICATE OF CORRECTION

PATENT NO. : 5,117,544
DATED : June 2, 1992
INVENTOR(S) : Kousaku Suzuki et al

It is certified that error appears in the above-indentified patent and that said Letters Patent is hereby corrected as shown below:

On the title page: should read;

[75] Inventors: Kousaku SUZUKI; Naoki OKUNO, both of Ishikawa, Japan

Column 18, Claim 5, line 2, after "includes" insert --means--
Column 19, Claim 10, line 7, "f" should be --of--
　　　　　　　　　line 17, correct the spelling of "value";
　　　　　　　　　　　　　　"substruction" should be
　　　　　　　　　　　　　　--subtraction--

Column 20, Claim 11, line 3, "circuits" should be --circuit--

Signed and Sealed this

Twelfth Day of July, 1994

Attest:

BRUCE LEHMAN

Attesting Officer　　　　Commissioner of Patents and Trademarks